Patented Feb. 12, 1952

2,585,230

UNITED STATES PATENT OFFICE 2,585,230

N-FLUOROALKYL-N-VINYLALKANAMIDES AND PREPARATION THEREOF

Harry W. Coover and Joseph B. Dickey, Rochester, N. Y., assignors to Eastman Kodak Company, Rochester, N. Y., a corporation of New Jersey No Drawing. Application November 16, 1949, Serial No. 127,802

20 Claims. (Cl. 260—89.7)

This invention relates to N-fluoroalkyl-N vinylalkanamides and a process for their preparation, and to synthetic resins which can be prepared therefrom. The new alkanamides can be represented by the following general formula:

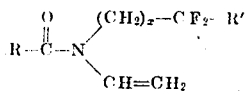

wherein R represents an alkyl radical containing from 1 to 3 carbon atoms, R' represents a hydrogen atom, a fluorine atom or an alkyl radical containing from 1 to 3 carbon atoms, and $x$ represents a whole number of from 1 to 4. Examples of such alkanamides include N-$\beta,\beta$-difluoroethyl-N-vinylacetamide; N-$\beta,\beta,\beta$-trifluoroethyl-N-vinylacetamide; N-$\gamma,\gamma,\gamma$-trifluoropropyl-N-vinylacetamide; N-$\beta,\beta$-difluoropropyl-N-vinylacetamide; N-$\gamma,\gamma$-difluoropropyl-N-vinylacetamide; N-$\gamma,\gamma$-difluoropentyl-N-vinylbutanamide; N-$\delta,\delta,\delta$-trifluorobutyl-N-vinylpropanamide; etc.

These N-fluoroalkyl-N-vinylalkanamides are useful in the preparation of homopolymers thereof, or in the preparation of copolymers by copolymerizing them in combination with other monomers, especially those containing the $CH_2=C<$ or $-CH=CH-$ groups.

It is an object of our invention to provide N-fluoroalkyl-N-vinylalkanamides and a process for their preparation. A further object is to provide novel synthetic resins prepared from N-fluoroalkyl-N-vinylalkanamides and a process for their preparation. Other objects will become apparent hereinafter.

In accordance with our invention, we prepare N-fluoroalkyl-N-vinylalkanamides by a process comprising pyrolyzing an N-fluoroalkyl-N-$\beta$-acyloxyethylalkanamide having the formula:

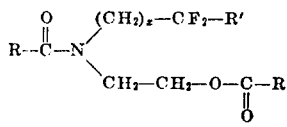

wherein R represents an alkyl radical containing from 1 to 3 carbon atoms, R' represents a hydrogen atom, a fluorine atom or an alkyl radical containing from 1 to 3 carbon atoms, and $x$ represents a whole number of from 1 to 4. Examples of such N-$\beta$-acyloxyethyl-containing alkanamides include N-$\beta,\beta$-difluoroethyl-N-$\beta$-acetoxyethylacetamide; N-$\beta,\beta,\beta$-trifluoroethyl-N-$\beta$-acetoxyethylacetamide; N-$\gamma,\gamma,\gamma$-trifluoropropyl-N-$\beta$-acetoxyethylacetamide; N-$\beta,\beta$-difluoropropyl-N-$\beta$-acetoxethylacetamide; N-$\gamma,\gamma$-difluoropropyl-N-$\beta$-acetoxyethylacetamide; N-$\gamma,\gamma$-difluoropentyl-N-$\beta$-butanoyloxyethylbutanamide; N-$\delta,\delta,\delta$-trifluorobutyl-N-$\beta$-propanoyloxyethylpropanamide; etc.

The pyrolysis can be conducted in any manner which will raise these N-fluoroalkyl-N-$\beta$-acyloxyethyl alkanamides to a temperature of from about 300° to about 650° C.

Advantageously, the pyrolysis of the N-fluoroalkyl-N-$\beta$-acyloxyethylalkanamides is conducted by passing at least one of these alkanamides through a heated tube containing a multitude of small pieces of an inert material which offers a large surface contact area to the alkanamide. Quite avantageously, a glass or metal tube which has been filled with small glass chips is employed. The temperature range within which the pyrolysis is conducted can be from about 300° to about 650° C. Higher or lower temperatures can be used, depending on the particular means employed for conducting the pyrolysis; however, the yields obtained below 300° C. or above 650° C. are generally small. In general, when apparatus as discussed above is employed, the advantageous temperature range is from about 400° C. to about 500° C. Generally speaking, yields of from about 60 to 70% or more can be readily obtained.

The effect of the pyrolysis is to split off from the parent compound the acyloxy group together with a hydrogen atom from the ethyl portion of the acyloxyethyl group, thereby forming the corresponding acid and leaving a vinyl substituent on the parent compound which has now become the desired product, viz. an N-fluoroalkyl-N-vinylalkanamide. This product can be readily purified by fractional distillation, thereby separating it from the acid formed as well as any of the parent compound which may remain unpyrolyzed and any other compounds that may be present. The resulting N-fluoroalkyl-N-vinyl alkanamides can then be polymerized as described below following Example 5.

The N - fluoroalkyl-N - $\beta$-acyloxyethylalkanamides which are pyrolyzed as described above can be prepared by a process comprising reacting fluoroalkyl-$\beta$-hydroxyethylamines of the formula:

$$R'F_2C-(CH_2)_x-NH-CH_2-CH_2-OH$$

wherein R' represents a hydrogen atom, a fluorine atom or an alkyl radical containing from 1 to 3 carbon atoms and $x$ represents a whole number of from 1 to 4, with an alkanoic anhydride of the formula:

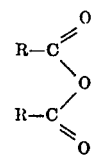

wherein each R represents an alkyl radical containing from 1 to 3 carbon atoms. Examples of such $\beta$-hydroxyethyl-containing amines include $\beta,\beta$-difluoroethyl-$\beta$-hydroxyethylamine; $\beta,\beta,\beta$-trifluoroethyl-$\beta$-hydroxyethylamine; $\gamma,\gamma,\gamma$-trifluoropropyl-$\beta$-hydroxyethylamine; $\beta,\beta$-difluoropropyl-$\beta$-hydroxyethylamine; $\gamma,\gamma$-difluoropropyl-$\beta$-hydroxyethylamine; $\gamma,\gamma$-difluoropentyl-$\beta$-hydroxyethylamine; $\delta,\delta,\delta$-trifluorobutyl-$\beta$-hydroxyethylamine; etc.

The reaction can be conducted by slowly adding a quantity of the fluoroalkyl-$\beta$-hydroxyethylamine to an approximately molecularly equivalent quantity of the alkanoic anhydride in a reaction vessel which is kept cool (room temperature or lower). Upon completion of the addition, the reaction mixture is heated until the reaction has reached its end point. It is generally advantageous to employ an excess of the anhydride in the reaction mixture in order to secure a practically quantitative conversion of the fluoroalkyl-$\beta$-hydroxyethyl amine to the N-fluoroalkyl-N-$\beta$-acyloxyethyl alkanamide. During the initial addition, the temperature is advantageously maintained between about 0° and 20° C. During the subsequent heating period, the reaction mixture is advantageously maintained between 75° and 100° C. The heating period will normally require about an hour to reach a fully satisfactory end point for the reaction. Quite advantageously, I maintain the mixture below 10° C. during the initial addition stage and then heat it for approximately one hour at around 85–95° C., after which the reaction mixture is fractionally distilled to separate out the N-fluoroalkyl-N-$\beta$-acyloxyethyl-alkanamide.

The fluoroalkyl-$\beta$-hydroxyethylamines which are employed above in the preparation of the N-fluoroalkyl-N-$\beta$-acyloxyethyl-alkanamides, can be prepared by a process comprising reacting fluoroalkylamines of the formula:

wherein R represents a hydrogen atom, a fluorine atom or an alkyl radical containing from 1 to 3 carbon atoms, with ethylene oxide. Examples of such fluoroalkylamines include $\beta,\beta$-difluoroethylamine; $\beta,\beta,\beta$-trifluoroethylamine; $\gamma,\gamma,\gamma$-trifluoropropylamine; $\beta,\beta$-difluoropropylamine; $\gamma,\gamma$-difluoropropylamine; $\gamma,\gamma$-difluoropentylamine; $\delta,\delta,\delta$-trifluorobutylamine; etc.

Advantageously, the reaction is conducted by dissolving approximately equimolecular quantities of the difluoroalkylamine and the ethylene oxide in a solvent which will not enter into the reaction itself and then heating this mixture in a closed vessel until the reaction has reached its end point. It is generally advantageous to employ an excess of the ethylene oxide in the reaction mixture in order to secure a practically quantitative conversion of the fluoroalkylamine to the fluoroalkyl-$\beta$-hydroxyethylamine. Examples of inert solvents which can be employed include the lower alkanols, e. g. ethyl alcohol, etc., various hydrocarbon solvents such as benzene, toluene, etc., and other solvents, e. g., dioxane, etc. The heating period depends upon the temperature and will vary accordingly. For a temperature of approximately 100° C., a period of 4 hours gives a satisfactory yield. However, higher or lower temperatures and correspondingly shorter or longer periods of time can be employed. Quite advantageously, I dissolve the fluoroalkylamine and the ethylene oxide in ethyl alcohol and heat the mixture in a sealed tube at approximately 100° C. for 4 hours after which the fluoroalkyl-$\beta$-hydroxyethylamine is separated by fractional distillation.

The fluoroalkylamines employed as disclosed above in the preparation of fluoroalkyl-$\beta$-hydroxyethylamines, and having the formula defined above, i. e.

are, for the most part, known compounds. Thus, when R represents a fluorine atom, i. e.,

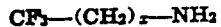

these compounds are disclosed in U. S. Patent No. 2,348,321 dated May 9, 1944, wherein these amines are prepared by reacting the corresponding $CF_3$—$(CH_2)_x$—Cl compound with ammonium hydroxide. When R represents an alkyl radical, i. e., $CH_3(CH_2)_{n-1}$—$CF_2$—$(CH_2)_x$—$NH_2$, or

where $n$ represents a whole number from 1 to 2 and $x$ represents a whole number from 1 to 4, these amines can be prepared by reacting ammonium hydroxide with the corresponding chloro, bromo or iodo compound in a manner similar to that described above. When R represents a hydrogen atom, e. g. $CHF_2$—$CH_2$—$NH_2$ which is described in Bull. sci. acad. roy. Belg., page 762 (1904), a similar process can be employed. Examples of such halo compounds include $CHF_2$—$CH_2$—Br described in J. A. C. S. 58, 883, 884 and 886 (1936); $CHF_2$—$CH_2$—I described in J. A. C. S. 58, 884 and 886 (1936); $CH_3$—$CF_2$—$CH_2$—$CH_2$—Cl described in J. A. C. S. 67, 1195 and 1196 (1945); $CH_3$—$CH_2$—$CF_2$—$CH_2$—Cl described at the same place, etc. The corresponding amines which can be produced from these illustrative compounds are $CHF_2$—$CH_2$—$NH_2$; $CH_3$—$CF_2$—$CH_2$—$CH_2$—$NH_2$; and $CH_3$—$CH_2$—$CF_2$—$CH_2$—$NH_2$.

In order to further illustrate the manner of practicing our invention, reference is made to the following five examples which illustrate the preparation of N-fluoroalkyl-N-vinylalkanamides.

EXAMPLE 1

*N-$\beta,\beta$-difluoroethyl-N-vinylacetamide*

Thirty-six (36) grams of N-$\beta,\beta$-difluoroethyl-N-$\beta$-acetoxyethylacetamide was pyrolyzed by passing it through a 2" glass tube packed with glass chips and maintained at 500° C. The pyrolysate was fractionally distilled under reduced pressure. N-$\beta,\beta$-difluoroethyl-N-vinylacetamide was obtained in a good yield (60–70%). It had a boiling point of 62–63° C. at 1 mm. of Hg pressure and can be represented by the formula:

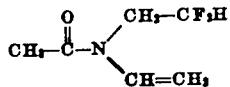

The 36 g. of N-$\beta,\beta$-difluoroethyl-N-$\beta$-acetoxyethylacetamide employed above was obtained by slowly adding 25 g. (0.2 mol) of $\beta,\beta$-difluoroethyl-$\beta$-hydroxyethylamine to 25 g. (approx. 0.25 mol) of acetic anhydride in a flask cooled in an ice bath. The temperature was kept below 10° C. during the addition. On completion of the addition, the reaction mixture was heated on a steam bath for one hour. Fractionation of the reaction mixture gave 36 g. of N-$\beta,\beta$-difluoroethyl-N-$\beta$-acetoxyethylacetamide which had a boiling point of 96–97° C. at 0.5 mm. of Hg pressure.

The $\beta,\beta$-difluoroethyl-$\beta$-hydroxyethylamine employed above was obtained by heating 22 g.

(0.5 mol) of ethylene oxide, 49 g. (approx. 0.6 mol) of β,β-difluoroethylamine and 100 cc. of ethyl alcohol at 100° C. for 4 hours in a sealed tube. Fractional distillation of the reaction mixture yielded 55 g. of β,β-difluoroethylamine which had a boiling point of 63–65° C. at 2 mm. of Hg pressure.

EXAMPLE 2

N-β,β,β-trifluoroethyl-N-vinylacetamide

Thirty-seven (37) grams of N-β,β,β-trifluoroethyl-N-β-acetoxyethylacetamide was pyrolyzed in exactly the same manner as in Example 1. Upon being fractionally distilled, a good yield (60–70%) of N-β,β,β-trifluoroethyl-N-vinylacetamide was obtained which had a boiling point of 55–58° C. at 1–2 mm. of Hg pressure and can be represented by the formula:

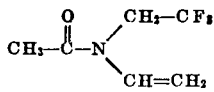

The N-β,β,β-trifluoroethyl-N-β-acetoxyethylacetamide employed above was obtained by slowly adding 29 g. of β,β,β-trifluoroethyl-β-hydroxyethylamine to 25 g. of acetic anhydride in a flask cooled in an ice bath. The temperature was kept below 10° C. during the addition. On completion of the addition, the reaction mixture was heated on a steam bath for 1 hour. Fractionation of the reaction mixture gave 37 g. of N-β,β,β-trifluoroethyl - N - β - acetoxyethylacetamide which had a boiling point of 79–80° C. at 1–2 mm. of Hg pressure.

The β,β,β-trifluoroethyl-β-hydroxyethylamine employed above was prepared by reacting ethylene oxide and β,β,β-trifluoroethylamine in a manner similar to that disclosed in Example 1.

EXAMPLE 3

N-γ,γ,γ-trifluoropropyl-N-vinylacetamide

A crude reaction product containing N-γ,γ,γ-trifluoropropyl-N-β-acetoxyethylacetamide (obtained as explained below) was pyrolyzed by passing it through a 2" glass tube packed with glass chips and maintained at 450° C. The pyrolysate was fractionally distilled under reduced pressure. A good yield of N-γ,γ,γ-trifluoropropyl-N-vinylacetamide was obtained which had a boiling point of 62–65° C. at 1 mm. of Hg pressure and can be represented by the formula:

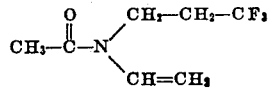

The crude reaction product containing N-γ,γ,γ-trifluoropropyl-N-β-acetoxyethylacetamide which was employed above was obtained by slowly adding the γ,γ,γ-trifluoropropyl - β - hydroxyethylamine obtained as explained below, to 51 g. of acetic anhydride in a flask cooled in an ice bath. The temperature was kept below 10° C. during the addition. The reaction mixture was then heated on a steam bath for 1 hour. The unreacted acetic anhydride and the acetic acid were removed by distillation to form the crude reaction product employed above.

The γ,γ,γ-trifluoropropyl-β-hydroxyethylamine employed above was obtained by heating 10 g. of ethylene oxide, 22.6 g. of γ,γ,γ-trifluoropropylamine and 100 cc. of ethyl alcohol at 100° C. for 4 hours in a sealed tube. The alcohol and unreacted amine were removed from the reaction product by distillation, thereby leaving the γ,γ,γ-trifluoropropyl-β-hydroxyethylamine which was employed above.

EXAMPLE 4

N-β,β-difluoropropyl-N-vinyl acetamide

A crude reaction product containing N-β,β-difluoropropyl - N - β - acetoxyethylacetamide (obtained as explained below) was pyrolyzed by passing it through a 2" glass tube packed with glass chips and maintained at 425° C. The pyrolysate was fractionally distilled under reduced pressure. A 60% yield of N-β,β-difluoropropyl-N-vinylacetamide was obtained which had a boiling point of 67–69° C. at 1 mm. of Hg pressure and can be represented by the formula:

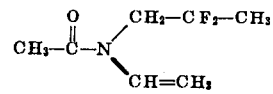

The crude reaction product containing N-β,β-difluoropropyl - N - β - acetoxyethylacetamide which was employed above was obtained by slowly adding the β,β-difluoropropyl-β-hydroxyethylamine obtained as explained below, to 50 g. of acetic anhydride in a flask cooled in an ice bath. The temperature was kept below 10° C. during the addition. The reaction mixture was then heated on a steam bath for 1 hour. The unreacted acetic anhydride and the acetic acid were removed by distillation to form the crude reaction product employed above.

The β,β-difluoropropyl - β - hydroxyethylamine employed above was obtained by heating 19 g. of β,β-difluoropropylamine, 10 g. of ethylene oxide and 100 cc. of dioxane in a sealed tube at 100° C. for 4 hours. The unreacted amine and the dioxane were removed by distillation, thereby leaving the β,β-difluoropropyl-β-hydroxyethylamine which was employed above.

EXAMPLE 5

N-γ,γ-difluoropropyl-N-vinylacetamide

A crude reaction product containing N-γ,γ-difluoropropyl - N - β - acetoxyethylacetamide was pyrolyzed by passing it through a 2" glass tube containing glass chips and maintained at 500° C. The pyrolysate was fractionally distilled under reduced pressure. A 65% yield of N-γ,γ-difluoropropyl-N-vinylacetamide was obtained which had a boiling point of 75–78° C. at 1 mm. of Hg pressure and can be represented by the formula:

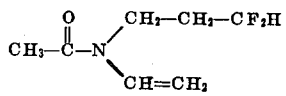

The crude reaction product containing N-γ,γ-difluoropropyl - N - β - acetoxyethylacetamide which was employed above was obtained by slowly adding the γ,γ-difluoropropyl-β-hydroxyethylamine, obtained as explained below, to 50° g. of acetic anhydride in a flask cooled in an ice bath. The temperature was kept below 10° C. during the addition. The reaction mixture was then heated on a steam bath for one hour. The acetic acid and unreacted acetic anhydride were removed by distillation to form the crude reaction product employed above.

The γ,γ-difluoropropyl - β - hydroxyethylamine employed above was obtained by heating 10 g. of ethylene oxide, 19 g. of γ,γ-difluoropropylamine and 100 cc. of ethyl alcohol in a sealed tube at 100° C. for 4 hours. The unreacted amine and the alcohol were removed by distillation, thereby leaving γ,γ-difluoropropyl-β-hydroxyethylamine which was employed above.

In a manner similar to that set forth in the above five examples, other N-fluoroalkyl-N-vinylalkanamides can be prepared. Thus, N-γ,γ-difluoropentyl-N-vinylbutanamide can be prepared by pyrolyzing N - γ,γ - difluoropentyl - N - β - butanoyloxyethylbutanamide which can be prepared by reacting butanoic anhydride with γ,γ-difluoropentyl-β-dydroxyethylamine which, in turn, can be prepared by reacting ethylene oxide with γ,γ-difluoropentylamine which can be prepared by reacting ammonium hydroxide with γ,γ-difluoro-α-chloropentane. In an analogous manner, N-δ,δ,δ-trifluorobutyl - N - vinylpropanamide can be prepared by pyrolyzing N-δ,δ,δ-trifluorobutyl-N-β-propanoyloxyethylpropanamide which can be prepared by reacting propanoic anhydride with δ,δ,δ - trifluorobutyl - β - hydroxyethylamine which, in turn, can be prepared by reacting ethylene oxide with δ,δ,δ-trifluorobutylamine which can be prepared by reacting ammonium hydroxide with δ,δ,δ-trifluoro-α-chlorobutane.

The N-fluoroalkyl-N-vinylalkanamides which are produced in accordance with our disclosure above, can be readily polymerized in accordance with methods well known in the art. The temperatures employed are not critical; polymerization can be accomplished at from around 0° C. up to 120° C., with higher or lower temperatures being also utilizable. The temperature employed will determine the range of molucular weights of polymers produced, lower temperatures resulting in higher molecular weights and vice versa.

Catalysts are not essential to the polymerization process; however, catalysts which can be employed with advantage include the organic and inorganic "per" compounds, the aliphatic azo compounds, etc. Examples of catalysts which can be employed include sodium perborate, potassium persulfate, ammonium persulfate, benzoyl peroxide, lauroyl peroxide, acetyl peroxide, hydrogen peroxide, azo bis isobutyro nitrile, etc.

Polymerization can be conducted at atmospheric, subatmospheric or superatmospheric pressures.

The N-fluoroalkyl-N-vinylalkanamide monomers can be copolymerized with one or more other monomers to form copolymers. Especially valuable products can be prepared by employing such other monomers as those containing the $CH_2=CH-$ group, the $CH_2=C<$ group, the $-CH=CH-$ group or the $>C=C<$ group.

Examples of such monomers which can be copolymerized with the N-fluoroalkyl-N-vinylalkanamides include methyl methacrylate; methyl acrylate; ethyl acrylate; diisopropyl fumarate; diethyl maleate; 1,3-butadiene, 2-chloro-1,3-butadiene, 2-fluoro-1,3-butadiene; 2-methyl-1,3-butadiene; acrylonitrile, styrene, vinylidene chloride; vinyl aceate; isopropenyl acetate; trifluorovinyl acetate; tetrafluoroethylene; 1,1-dichloro-2,2-difluoroethylene; etc. The conditions advantageous to the preparation of such copolymers are similar to those set forth above in regard to the preparation of the homopolymers.

The processes of polymerization which can be employed in the preparation of either homo- or copolymers include polymerization in bulk, in solution or in suspension (i. e., granular or emulsion polymerization in aqueous or other suitable diluents).

In employing the emulsion polymerization process, it is advantageous to employ a redox system for the catalysis of the polymerization reaction. Thus, the monomers can be added to an aqueous solution containing a dispersing agent to form an emulsion and to which there are added a peroxide type catalyst, such as those listed above, together with a reducing compound known as an activator. Dispersing agents include surface active compounds, such as the alkali metal alkyl-sulfonates, fatty acid salts, etc., e. g., sodium laurate, etc. Activators include compounds such as sodium bisulfite, ferrous sulfate, triethanol amine, etc. The emulsion is kept under agitation during the polymerization, following which the polymer can be precipitated by the addition of a concentrated salt solution. The precipitated polymer can be washed so as to prepare a pure product.

The manner of practicing our invention in regard to the preparation of such polymers is further illustrated by the following examples:

EXAMPLE 6

Five grams of N-β,β-difluoroethyl-N-vinylacetamide, 15 g. of acrylonitrile, 0.17 g. of ammonium persulfate, and 0.34 g. of sodium bisulfite were added to 180 cc. of distilled water and agitated for several hours at room temperature. An 85% yield of a white polymer was obtained which is soluble in dimethylacetamide.

In place of the N-β,β-difluoroethyl-N-vinylacetamide in the above example, substitution can be made of N-β,β,β-trifluoroethyl-N-vinylacetamide and a similar product obtained.

EXAMPLE 7

Five grams of N-β,β,β-trifluoroethyl-N-vinylacetamide, 5 g. of methyl methacrylate, and 0.1 g. of acetyl peroxide were heated in a sealed tube at 50° C. for 15 hours. The polymerization product was a water-clear hard rod. The polymer is soluble in acetone and can be readily molded.

In place of the methyl methacrylate in the above example, substitution can be made of styrene, ethyl acrylate, or diisopropyl fumarate to produce polymerization products.

EXAMPLE 8

Five grams of N-γ,γ,γ-trifluoropropyl-N-vinylacetamide and 5 g. of styrene were added to 50 ml. of distilled water containing 1 g. of potassium laurate, 0.2 g. of potassium persulfate and 0.2 g. of sodium bisulfite. This mixture was then agitated for 12 hours at 50° C. The resulting polymer was then precipitated by the addition of a saturated solution of sodium chloride.

EXAMPLE 9

One gram of N-β,β-difluoropropyl-N-vinylacetamide, 8 g. of vinylidene chloride, 0.2 g. of ammonium persulfate, 0.2 g. of sodium bisulfite and 2 g. of potassium laurate were added to 50 ml. of distilled water. This mixture was agitated at room temperature and the polymerization was complete within 6–8 hours. The polymer was then precipitated by the addition of a concentrated solution of sodium chloride. The resulting polymer was soluble in cyclohexanone and can be molded.

EXAMPLE 10

Five grams of N-γ,γ-difluoropropyl-N-vinylacetamide, 7 g. of methyl acrylate and 0.2 g. of benzoyl peroxide were heated at 80° C. for 15–16 hours. A clear, rubbery, acetone-soluble polymer was obtained.

In a manner similar to that set forth above, other polymers and copolymers can be prepared. Two or more of the N-fluoroalkyl-N-vinylacetamides can be copolymerized together or can be copolymerized with one or more of the other types of compounds disclosed above.

What we claim as our invention and desire to secure by Letters Patent of the United States is:

1. N - fluoroalkyl - N - vinylalkanamides represented by the formula:

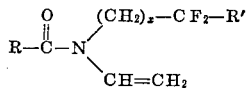

wherein R represents an alkyl radical containing from 1 to 3 carbon atoms, R' represents a member selected from the group consisting of an alkyl radical containing from 1 to 3 carbon atoms, a hydrogen atom and a fluorine atom, and $x$ represents a whole number of from 1 to 4.

2. N - $\beta,\beta$-difluoroethyl-N-vinylacetamide having the formula:

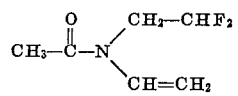

3. N - $\beta,\beta,\beta$ - trifluoroethyl - N - vinylacetamide having the formula:

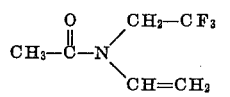

4. N-$\beta,\beta$-difluoropropyl-N-vinylacetamide having the formula:

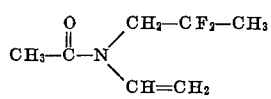

5. Polymers of the compounds defined in claim 1.
6. Polymers of the compound defined in claim 2.
7. Polymers of the compound defined in claim 3.
8. Polymers of the compound defined in claim 4.
9. A process for preparing N-fluoroalkyl-N-vinylalkanamides having the formula:

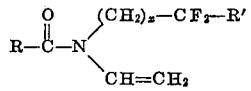

comprising pyrolyzing N-fluoroalkyl-N-$\beta$-acyloxyethylalkanamides having the formula:

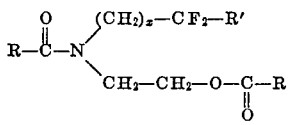

wherein R represents an alkyl radical containing from 1 to 3 carbon atoms, R' represents a member selected from the group consisting of an alkyl radical containing from 1 to 3 carbon atoms, a hydrogen atom and a fluorine atom, and $x$ represents a whole number of from 1 to 4.

10. A process as defined in claim 9 wherein the pyrolysis is performed at a temperature of from 300° C. to 650° C.

11. A process as defined in claim 10 wherein the pyrolysis is performed at a temperature of from 400° C. to 500° C.

12. A process for preparing N-$\beta,\beta$-difluoroethyl-N-vinylacetamide having the formula:

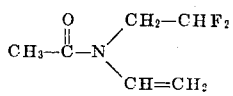

comprising pyrolyzing N-$\beta,\beta$-difluoroethyl-N-$\beta$-acetoxyethylacetamide having the formula:

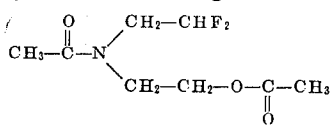

13. A process as defined in claim 12 wherein the pyrolysis is conducted at a temperature of from 300° C. to 650° C.

14. A process as defined in claim 13 wherein the pyrolysis is conducted at a temperature of from 400° C. to 500° C.

15. A process for preparing N-$\beta,\beta,\beta$-trifluoroethyl-N-vinylacetamide having the formula:

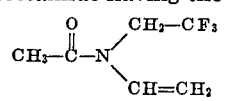

comprising pyrolyzing N-$\beta,\beta,\beta$-trifluoroethyl-N-$\beta$-acetoxyethyl-$\beta$-acetamide having the formula:

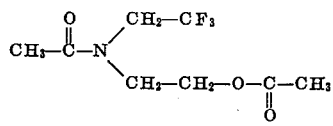

16. A process as defined in claim 15 wherein the pyrolysis is conducted at a temperature of from 300° C. to 650° C.

17. A process as defined in claim 16 wherein the pyrolysis is conducted at a temperature of from 400° C. to 500° C.

18. A process for preparing N-$\beta,\beta$-difluoropropyl-N-vinylacetamide having the formula:

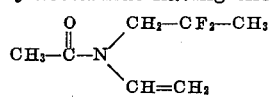

comprising pyrolyzing N-$\beta,\beta$-difluoropropyl-N-$\beta$-acetoxyethyl-$\beta$-acetamide having the formula:

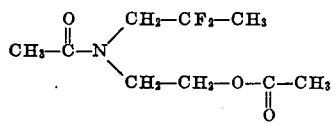

19. A process as defined in claim 18 wherein the pyrolysis is conducted at a temperature of from 300° C. to 650° C.

20. A process as defined in claim 19 wherein the pyrolysis is conducted at from 400° C. to 500° C.

HARRY W. COOVER.
JOSEPH B. DICKEY.

REFERENCES CITED

The following references are of record in the file of this patent:

UNITED STATES PATENTS

| Number | Name | Date |
|---|---|---|
| 2,231,905 | Hansford et al. | Feb. 18, 1941 |
| 2,458,421 | Reynolds et al. | Jan. 4, 1949 |